United States Patent [19]
Lombard et al.

[11] 3,795,383
[45] Mar. 5, 1974

[54] BALL-TYPE SOLENOID VALVES AND METHODS OF ASSEMBLING SAME

[75] Inventors: Claude Edmond Lombard; Claude Daniel Moyses, both of Billancourt, France

[73] Assignee: Regie Nationale Des Usines Renault, Billancourt (Hauts de Seine), France

[22] Filed: Dec. 7, 1972

[21] Appl. No.: 312,929

[30] Foreign Application Priority Data
Dec. 21, 1971 France .............................. 71.045904

[52] U.S. Cl. ............. 251/139, 29/157.1 R, 251/141
[51] Int. Cl. ............................................ F16k 31/06
[58] Field of Search ......... 251/139, 141; 29/157.1 R

[56] References Cited
UNITED STATES PATENTS

| | | | |
|---|---|---|---|
| 3,107,893 | 10/1963 | Bashe ............................... | 251/332 X |
| 3,407,827 | 10/1968 | Follett .............................. | 251/65 X |
| 3,443,585 | 5/1969 | Reinicke .......................... | 251/141 X |
| 3,628,767 | 12/1971 | Lombard ......................... | 251/141 X |

FOREIGN PATENTS OR APPLICATIONS

| | | | |
|---|---|---|---|
| 744,858 | 2/1956 | Great Britain ........................ | 251/65 |
| 1,001,073 | 1/1957 | Germany .......................... | 251/139 |

*Primary Examiner*—Arnold Rosenthal
*Attorney, Agent, or Firm*—Stevens, Davis, Miller & Mosher

[57] ABSTRACT

The ball guide of this solenoid valve, consists of a pressed member acting at the same time as the end cover of the valve case so as to close the magnetic circuit thereof; it consists of magnetic metal formed with a cylindrical projection having formed at the same time in its bore longitudinal grooves for permitting the fluid flow, other means being provided for properly sealing the core passage in the closed valve position.

13 Claims, 12 Drawing Figures

PATENTED MAR 5 1974 3,795,383

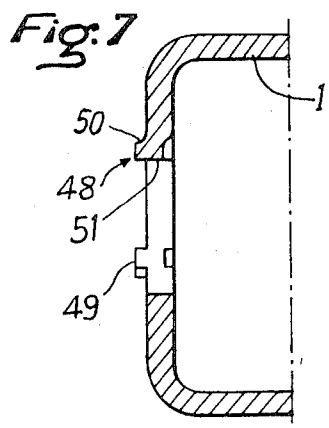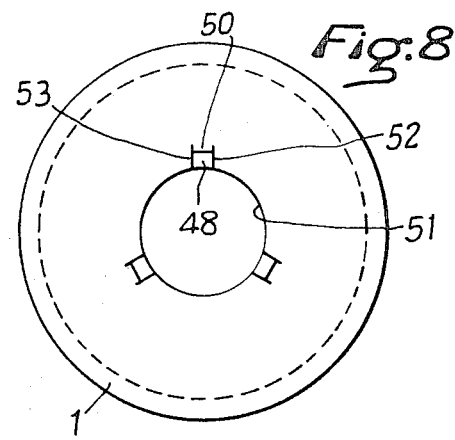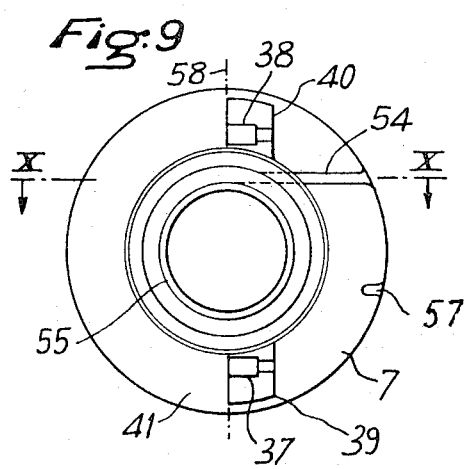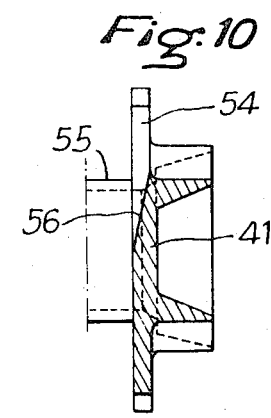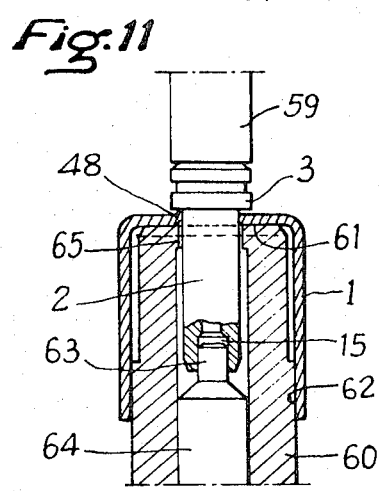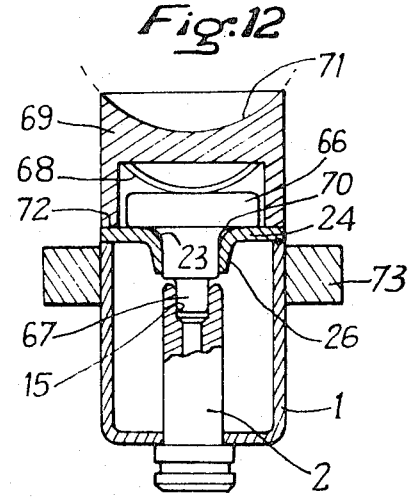

BALL-TYPE SOLENOID VALVES AND METHODS OF ASSEMBLING SAME

This invention relates in general to ball-type solenoid-operated valves, that is, valves wherein the valve member proper consists of a ball.

Solenoid valves are already known for example through the U.S. Pat. Nos. 3,355,145 and 3,628,767, wherein the ball member of magnetic material, guided in a cylindrical bore, has the dual function of a movable core and a ball valve, the fixed core constituting a passage for the introduction of fluid into the valve.

This invention is directed to improvements in the efficiency of solenoid valves of this character and also to reduce their manufacturing cost, these two purposes being closely related in the construction contemplated herein.

The improvement in the valve efficiency in comparison with hitherto known devices of this type is obtained notably by:

modifying the shape of the ball guide means and also of the core with a view to improve the flux (along a shorter length) of the coil lines of force;

reducing the metal deformation during the assembling steps, the conventional crimping and setting operations being henceforth replaced by electric spot welding operations limited to the ball guide and the core;

modifying the inner and outer configuration of the flexible valve seat, and increasing the surface area through which this seat is anchored to the core.

The solenoid valve according to this invention, which comprises a pressed case of magnetic material enclosing the electromagnet coil, the hollow fixed core constituting the inlet passage for the fluid, a flexible seat, a ball of magnetic material for closing said passage and a ball guide constituting at the same time the case cover for closing the magnetic circuit and comprising in its central portion longitudinal grooves to permit the fluid flow, is characterised in that the ball guide consists of a pressed plate of magnetic sheet-metal having in its central portion a cylindrical guide projection in which are jointly formed by embossing the longitudinal fluid-flow grooves and other means for properly sealing the core passage in the closed-valve position.

In a modified form of embodiment of the valve of this invention, the flexible valve seat and its mounting member are replaced by a ball of flexible material adapted to be pressed against its seat by the magnetic ball. The coil filling rate is improved according to this invention by providing a novel design for the outlet slot and a modified system for anchoring the coil wires of which the connector is retained in a stepped groove.

The general result deriving from these various improvements is an increment in the maximum pressure rating of the device, a reduction in the residual magnetism and the improved reproducibility of performances from one device to another.

A better understanding of this invention will be had through the following description given with reference to the accompanying drawings illustrating two forms of embodiment of the invention. In the drawings:

FIG. 7 is a fragmentary axial section of the valve case, consisting preferably of pressed sheet metal, for illustrating the pressed portions facilitating the welding of the core thereto;

FIG. 8 is a front view showing the pressed portions of FIG. 7;

FIG. 9 is a front view of the coil, showing the initial end of the slot receiving the inner wire, along a tangent to the circle having the coil winding diameter;

FIG. 10 is a section taken along a plane X—X parallel to the axis of the valve assembly and through the wire inlet slot, at right angles to the plane of FIG. 9;

FIG. 11 shows the electric resistance-welding electrodes for welding the core to the case, and the centering surface members, and FIG. 12 illustrates the electrodes and the centering surface member permitting the assembling of the ball guide and valve case during the welding operation.

Figure 1:
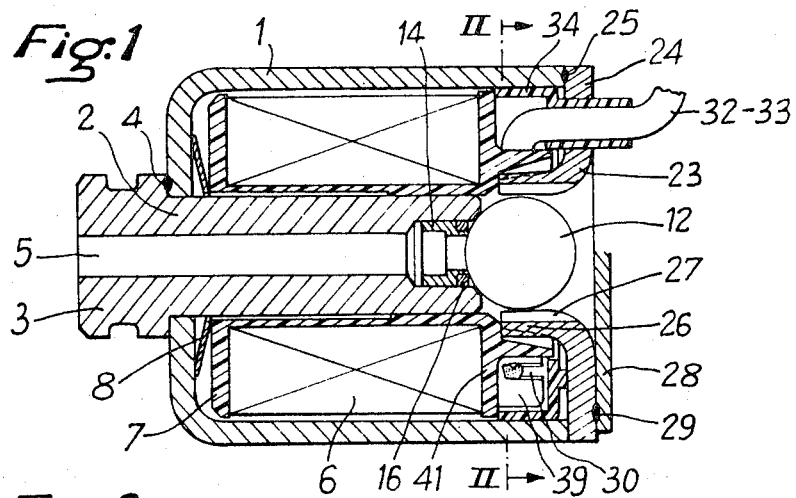
FIG. 1 is an axial section taken along the line I—I of FIG. 2, showing a first form of embodiment of the device.
Figure 2:
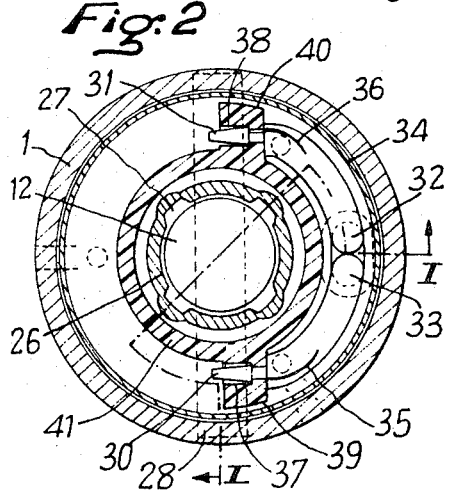
FIG. 2 is a cross section taken along the line II—II of FIG. 1, i.e., across the ball guide and the wire lead-out.
Figure 5:
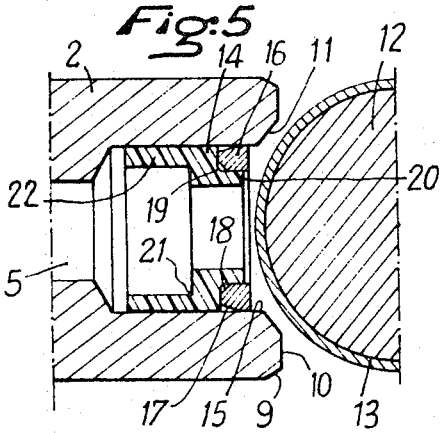
FIG. 5 is a fragmentary axial section showing on a larger scale the core end adjacent the ball, the flexible valve seat and the retaining washer of this seat.

Referring first to FIGS. 1 and 2, it will be seen that the solenoid valve comprises a pressed cylindrical case 1 containing a fixed magnetic core 2 provided with a connecting end piece 3 welded electrically at 4 to the bottom of case 1. The fixed core 2 constitutes a fluid inlet passage 5 and is surrounded by the electromagnet winding 6 comprising a coil spool 7 of suitable plastic material, such as thermoplastic or thermosetting resin; said core 2 is constantly urged resiliently away from the bottom of case 1 by a dished spring washer 8 disposed between said bottom and said spool. The inner end of fixed core 2 is bevelled, as shown more in detail in FIG. 5, and comprises an outer bevel 9, a relatively broad flat face 10 and an inner bevel 11. This inner bevel 11 is engaged by a ball 12 constituting the movable core and the valve member; this ball 12 is coated with non-magnetic material 13. The function of the outer bevel 9 is to concentrate the magnetic flux of the electromagnet and to facilitate the mounting of the fixed core 2 in the case 1.

A hollowed seat 14 of flexible material is fitted in the bore 15 terminating the passage 5 at the inner end of core 2. A lock washer 16 adapted to retain the seat in position is force fitted in the bore 15 and its introduction is facilitated by the moderately inclined bevel 17 formed on its outer edge. On the inner edge of this washer 16 is another bevel 18 of somewhat greater angle, registering with a rounded inner corner 19 formed in a shoulder of seat 14 adjacent its end face 20.

The seat 14 has an inner portion 21 of greater diameter providing a sharp shoulder to prevent the reaction of its skirt 22 against the operative end face 20 of said seat 14. The ball 12, when exposed to the magnetic pull of fixed core 2, is caused to engage at the end of its stroke the inner bevel 11 of core 2, the lock washer 16 and the end face 20 of seat 17.

Reverting to FIG. 1, it will be seen that ball 12 is disposed centrally of a pressed end cover 23 of magnetic material comprising an annular flange welded at 25 to the annular edge of the open end of case 1 and a concentric cylindrical central portion 26 adapted to guide the ball valve 12 during its axial movements. This cylindrical portion 26 has formed in its bore longitudinal grooves 27 parallel to the axis of fixed core 2 and obtained through a die-stramping operation attended by the upsetting of metal to the outside during the pressing of the guide cover 23, as illustrated in FIG. 2.

A diametral strip 28 illustrated in dash lines in FIG. 2 is welded at 29 to the flange 24 of cover 23 and acts as an abutment for retaining the ball 12 when the valve is open.

The winding 6 is connected via connectors 30, 31 to the wires 32, 33 of the lead-out cable; an insulating sleeve 34 extending through the cover flange 24 protects the lead-out cable from any detrimental contact with metal parts. As shown more in detail in the cross-sectional view of FIG. 2, the wires 35, 36 of coil 5 are connected to the lead-out cable wires 32, 33 through crimped connectors 30, 31 of a known type adapted to be fitted by breaking the enamelled coating, without stripping the wires. A certain length of conductive wire is left in its bare condition between each connector and the insulating sheath or sleeve of the lead-out wires. Both connectors and wires are fitted in stepped grooves 37 and 38 formed in projections 38 and 40 carried by the inner end flange 41 of coil spool 7, so as to hold against any tractive and torsional efforts the lead-out wires 32, 33. In fact, the connectors 30, 31 have a substantially lozenge-shaped cross-sectional configuration after the crimping step and cannot rotate.

Figure 3:
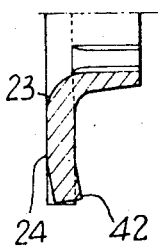
FIG. 3 is an axial section showing details of a weld lug partly pressed in the flange of the ball guide.
Figure 4:
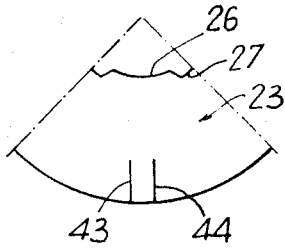
FIG. 4 is a front view of the ball guide portion shown in FIG. 3.

FIGS. 3 and 4 illustrate in detail the pressed lugs 42 for the resistance welding of guide 23 to the case 1 before assembling the component elements of the device. These lugs are obtained by permanent deformation and shearing and provide at 43 and 44 side faces substantially perpendicular to the flange 24, the thus raised portion providing an inclined plane rising from the inside to the outside of the ball guide.

Figure 6:
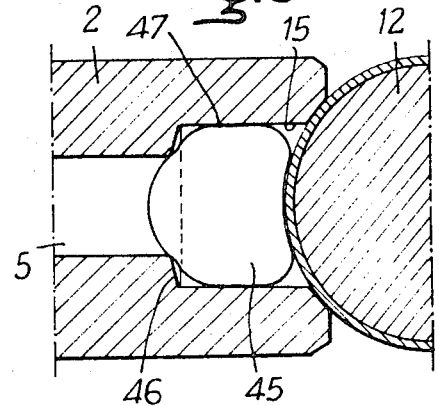
FIG. 6 is an axial section showing on a larger scale the modified form of embodiment wherein the flexible seat and its retaining washer are replaced by a ball of relatively small diameter, of flexible material, adapted to provide a fluid-tight joint directly with a shoulder of said core or on the inner bore.

According to a modified form of embodiment of the flexible seat, which is illustrated in FIG. 6, the ball 12 engages and presses a small ball 45 of flexible material into the bore 15 of core 2 against a shoulder 46 of passage 5. The function of this flexible ball 45 is to seal the joint formed between this ball 45 and the shoulder and/or the bore 15 at 17, so that the flexible seat and its retaining or lock washer 16 of FIG. 5 can be dispensed with.

In FIGS. 7 and 8 lugs 48 are shown as being pressed in the bottom of case 1 for welding same to the core. These lugs comprise a flat portion 43 and a sloped portion 50 the inclination of which is directed outwardly, towards the central hole 51 of case 1, the side faces 52 and 53 of each lug being substantially perpendicular to the case bottom.

FIGS. 9 and 10 show the coil spool 7 having formed in its flange 41 a slot 54 for the lead-in wire which is tangent to the circumference of the inner diameter of the spool. The end 56 of slot 54 is skew and has a gradually decreasing cross-section so that the lead-in wire can be spaced from the other wires from the very first layer of coil turns. This arrangement is made necessary by the relatively large diameter of the central cylindrical projection 23 acting as a guide to the ball 12. The wire lead-out is provided at the outer periphery of the coil spool, at 57. Therefore, the spool mould can be reduced to only two sections having a joint plane 58.

To assemble the core 2 and case 1 a suspended welding electrode 59 is pressed against the endpiece 3 of core 2, as illustrated in FIG. 11. This electrode 59 presses the core against the welding lugs 48 of case 1 supported and guided by the other welding electrode 60 engaging the case bottom at 61 without contacting same laterally. The electrode 60 is centered along a relatively short length of case 1, at 62, by means of a shoulder located substantially at the same level as the bearing surface 63 of the insulating centering member 64 in the central hole 15 of core 2; the electrode 60 does not contact the core at 65 in the vicinity of the case bottom.

The ball guide or cover 23 is welded to the case 1 before fitting the washer 16 and the flexible seat 14, as illustrated in FIG. 12. An insulating and shouldered centering member 66 ensures through a stud 67 the necessary concentricity between the cylindrical portion 26 of ball guide 23 and the hole 15 of core 2. A spring 68 pressed by the upper welding electrode 69 causes the shoulder 70 of said centering member to properly engage the flange 24 of member 23. A clamp-type counter-electrode 73 provides the return path for the welding current, as closely as possible, while holding the case 1.

The diametral strip 28 (FIGS. 1 and 2) provided at its ends with conventional welding bosses is welded by using the same mounting as that shown in FIG. 12, by removing the centering member 66, the strip 28 being disposed at 70 between the electrode 66 and guide member 23. Under these conditions the strip 28 is welded without using any direct counter-electrode. The shape and relative arrangement of the parts are so selected that the welding operations can be performed by using the same electrodes and the same adjustments as those contemplated for welding the guide member 23 to the case 1.

The lock washer 16 for locking the seat 14 in position is fitted into the bore 15 of core 2 by means of a suitably shaped tool, but this is not a difficulty, due to the high degree of precision by which the manufacture of the ball 12 is attended nowadays, even after the electrolytic coating thereof. This electrolytic treatment takes place preferably in a basic medium for, notably in the case of copper, the deposits thus obtained are very hard and impervious, due to their lack of porosity. A minimum ball hardness of the order of 1.5 times the surface hardness of the core is desirable in order to avoid any undesired hammering of the ball as a consequence of repeated shocks against the core.

The above-described apparatus operates as follows :

When the coil 6 is energized, the ball 12 is attracted by the core 2 and engages the bevel 11 of this core, the washer 16 and the flexible seat 14 at 20, this cutting off the ingress of fluid into passage 5. In certain applications the ball guide 23 may be mounted inside-out with respect to the core 2, but as a rule this change reduces the efficiency of the device, due to a less advantageous configuration of the magnetic path and an increment in magnetic leakages.

What is claimed as new is:

1. Ball-type solenoid valve comprising a case of pressed magnetic material enclosing an electromagnet coil winding, a fixed core constituting a fluid inlet passage, a flexible seat, a ball of magnetic material for closing said passage and a ball guide acting at the same time as a case end cover for closing the magnetic circuit, said ball guide comprising in its central aperture longitudinal grooves to permit the fluid flow therethrough, characterised in that said ball guide consists of a pressed magnetic sheet-metal flange formed with an integral central cylindrical projection in which said longitudinal fluid flow grooves are formed jointly by upsetting the metal of said projection, other means being provided for properly closing the core passage in the closed valve position.

2. Solenoid valve according to claim 1, characterised in that pressed lugs are formed in the outer periphery of said ball-guide flange by permanent deformation and partial shearing of the marginal portion thereof, each lug comprising from its center outwards an inclined plane having side faces substantially perpendicular to the flange, said lugs being adapted to be welded electrically to said case.

3. Solenoid valve according to claim 2, characterised in that the case enclosing said fixed core comprises welding lugs registering with a shoulder of said core, said lugs being obtained by permanent deformation and partial shearing and constituting each an inclined plane extending from the exterior to the center of said case, with a substantially flat upper face and side faces substantially perpendicular to the case bottom, said lugs being adapted to be welded electrically to said core.

4. Solenoid valve according to claim 3, characterised in that the magnetic core end registering with said ball has two bevelled edges, namely an outer edge and an inner edge, with a flat annular face extending therebetween and interconnecting said bevels.

5. Solenoid valve according to claim 4, characterised in that said magnetic ball is coated in a manner known per se with non-magnetic material, the hardness of this coating material being at least 1.5 times the hardness of the magnetic core by which said ball is attracted in the energized condition of the solenoid valve winding, which core is engaged by said wall, said coating consisting for example of electrolytic copper obtained in a basic medium.

6. Solenoid valve according to claim 1, characterised in that the flexible valve seat consists in a manner known per se of a tubular element engaging the widened end of the fluid passage in said core, said tubular element comprising an inner shoulder and an outer shoulder having a slightly rounded corner at its inner diameter, a lock washer being adapted to engage said outer shoulder, the end portion of reduced diameter of said tubular element which is engaged in said washer having in all cases a length inferior to the thickness of said washer.

7. Solenoid valve according to claim 6, characterised in that said washer is force fitted into said core and comprises on its side registering with said flexible seat an outer bevel of moderate inclination adapted to facilitate the force fitting of said washer while avoiding the upsetting of the washer metal, and on its inner diameter another bevel of greater inclination adapted to be engaged by the rounded corner of said flexible seat.

8. Solenoid valve according to claim 1, characterised in that said flexible seat consists of a small ball of suitable flexible material retained in the central passage of said core and adapted to co-act with said movable ball for closing the core passage through said small flexible ball, the necessary fluid-tightness being obtained by deformation of said small ball either against a reduced diameter of said passage and/or along a certain length of the widened portion of said passage.

9. Solenoid valve according to claim 1, characterised in that the coil spool of insulating material on which the electromagnet winding is formed comprises on one of its flanges a slot having a skew bottom, said slot opening tangentially to the inlet into the bottom of said spool.

10. Solenoid valve according to claim 9, in which the connection between the enamelled wires of said winding and the lead-out wires of greater diameter is obtained in a manner known per se by using weldless connectors adapted to break the enamel layer during the crimping operation, the valve being characterised in that said lead-out wires are held in position in stepped grooves formed in a strip perpendicular to the spool flange, the narrowest portion of each groove being disposed between the connector and the insulation of the lead-out wire and containing the conductor of said lead-out wire.

11. Solenoid valve according to claim 3, characterised in that when said case and core are assembled a welding electrode disposed within the case for delivering welding current just under the welding lugs comprises an external shoulder for centering said electrode in the case along a relatively short length on the side of the major aperture, and that an internal insulating centering member is adapted to penetrate by means of a stud into the central passage of said core, the two inner and outer centering portions lying substantially at a same level perpendicular to the axis of the device.

12. Solenoid valve according to claim 2, characterised in that during the assembling of the ball with the core an insulating centering member penetrating through the guide member is formed on the one hand with a shoulder urged by a spring associated with said welding electrode against the flat outer face of said guide member and on the other hand with a stud engaging said central passage of said core, said electrode being of the swivel type whereas a counter-electrode is pressed, as close as possible, against the outer surface of said case.

13. Solenoid valve according to claim 3, characterised in that a diametral strip of sheet metal constitutes the means for preventing the ball valve from escaping in the open valve position, said strip having formed at its ends welding lugs of conventional type and welded to the ball guide without using a bearing counter-electrode located very close thereto, by using the same electrodes and the same welding current and pressure as those required for welding the ball guide to the case.

* * * * *